Sept. 23, 1969
N. T. EVANS
3,467,994
TIGHTENING DEVICE FOR ROPE AND THE LIKE
Filed Aug. 1, 1967
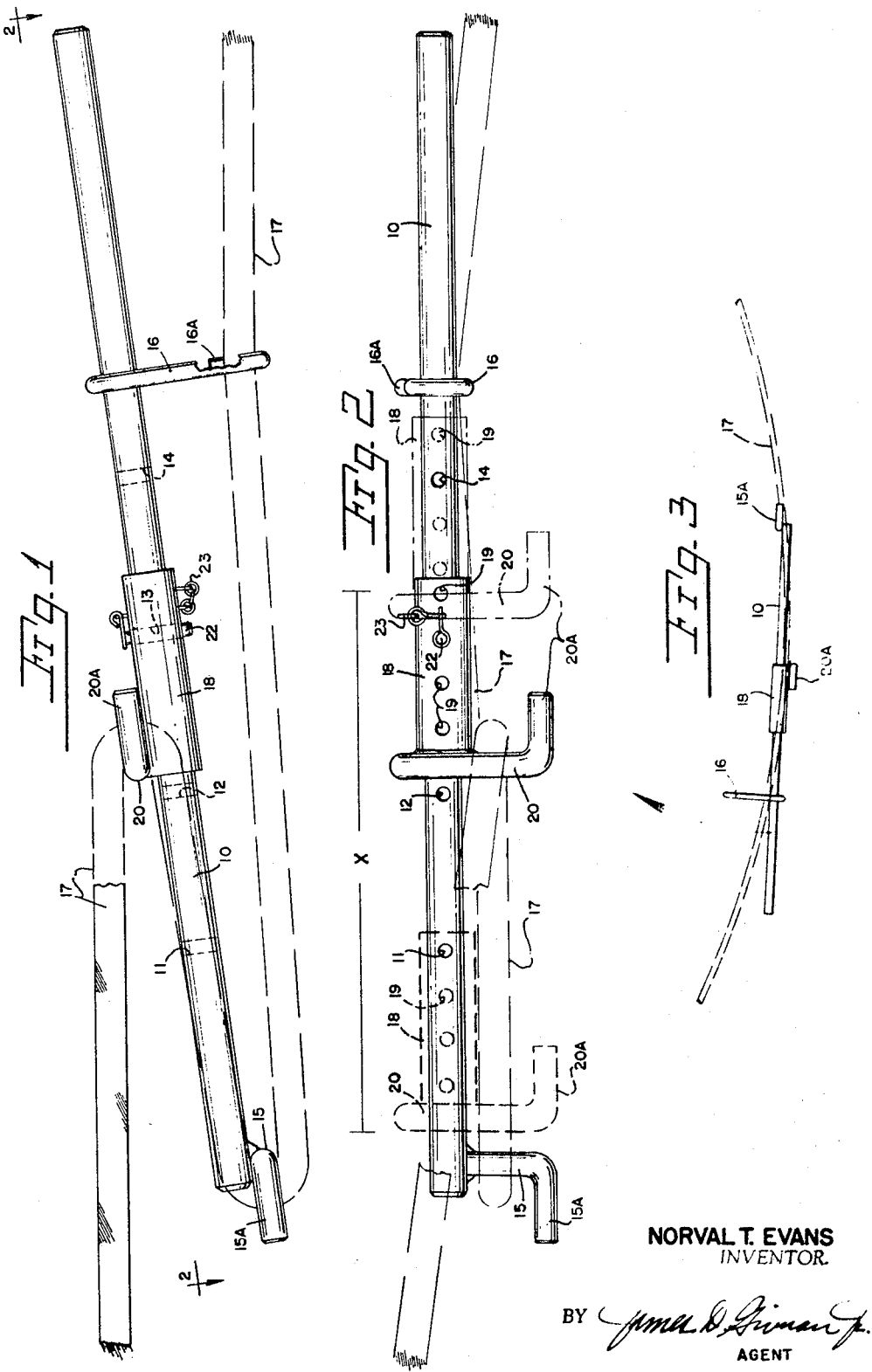
NORVAL T. EVANS
*INVENTOR.*
BY *James D. Trimau Jr.*
AGENT

United States Patent Office 3,467,994
Patented Sept. 23, 1969

3,467,994
TIGHTENING DEVICE FOR ROPE AND THE LIKE
Norval T. Evans, 691 NE. Meadow,
Roseburg, Oreg. 97470
Filed Aug. 1, 1967, Ser. No. 657,635
Int. Cl. A44b 21/00
U.S. Cl. 24—71.2　　　　　　　　　　3 Claims

ABSTRACT OF THE DISCLOSURE

A rod-like device for taking up slack and having a positionable sleeve slidably mounted relative to a fixed arm and adjustably carrying a companion arm for engagement with a rope or other flexible element. The positionable sleeve and its arm may be temporarily located at widely varying distances from the fixed arm for the precise tensioning of the flexible element.

Background of the invention

The present invention relates to improvements in those types of devices which may be applied to flexible elements such as ropes, clotheslines, wire fence components for the taking up of slack therein. The prior art I am aware of shows generally various types of rope tightening devices which may be temporarily applied to flexible elements being tightened and in which the tightening is accomplished by one or more wrapping turns of the device relative to the element. For the most part these devices have fixed members for engaging the flexible element and accordingly must take up slack only in increments equal to the fixedly spaced apart members. The prior art devices which do provide for some degree of adjustability of those members engaging the flexible element require several turns of the device to take up any considerable amount of slack.

The present invention provides an uncomplicated rope-tightening device which lends itself to convenient application to a rope or other flexible element to take up varying amounts of slack therein. Further, when applied to rope or the like it is prevented from accidental separation by the novel shape of its rope-engaging members.

The instant device is particularly useful in the tightening of short runs of rope such as, for instance, in the tying down or securing of loads on trailers or roof racks of automobiles wherein it is necessary to adapt the tightening device for the accurate taking up of small amounts of slack as occurs from stretching of a rope or the pulling tight of the knotted rope ends.

A further advantage of the present invention resides in its simple and uncomplicated structure wherein all parts are retained against accidental loss making the same highly useful in regard to use on moving vehicles wherein the flexible elements or rope are subject to violent movement or whipping caused by the air flow about the vehicle.

Summary of the invention

The present device permits the taking up of slack in a flexible element by a simple, semi-circular motion of the device wherein a rope-engaging fixed arm and a positionable arm double back a segment of the flexible element. By reason of the movable arm being positionable throughout a wide range of spacing relative to the fixed arm, the slack may be taken up in precise increments and without the necessity of wrapping the device about the flexible element by a plurality of turns. The fixed and movable arms additionally provide, by reason of their configuration, for their retention on the tightened flexible element with little chance of accidental loss regardless of the particular use to which the present invention is applied.

Description of the drawing

FIGURE 1 is a side elevation of the present invention in operative engagement with a segment of a tightened flexible element, FIGURE 2 is a plan view of the invention taken along line 2—2 of FIGURE 1, and FIGURE 3 is a view of the invention applied to a section of slack rope preparatory to a semi-circular tightening motion in the direction of the applied arrow.

Description of the preferred embodiment

With continuing reference to the drawings and particularly FIGURES 1 and 2 thereof, the reference numeral 10 indicates the main body of the invention which is preferably of rod shape which is transversely apertured at spaced apart intervals as at 11, 12, 13 and 14.

A fixed arm 15 is welded to the forward end of the main body 10 and extends laterally therefrom terminating in a forwardly turned portion 15A extending parallel to the main body member 10. The fixed arm 15 is secured as by welding to the underside of the main body when viewed in the operative position of FIGURE 1.

Affixed to the main body 10 toward its opposite or rearward end is a retainer hook 16 depending vertically therefrom and terminating downwardly in a hook portion indicated at 16A which when the device is applied to a rope forcefully engages the same. A segment of rope is indicated at 17.

With continuing reference to FIGURES 1 and 2 and particularly the latter, it will be seen that the depending retainer hook causes the rope to lie adjacent the main body 1 of the device.

A sleeve indicated at 18 is slidably carried by the main body 10 for positioning within that section of the main body 10 extending from the fixed arm 15 rearwardly to the retainer hook 16. The sleeve is also provided with a plurality of vertically disposed transverse openings indicated at 19 longitudinally spaced along its length and which may be brought into registry with the aforementioned apertures 11 through 14 within the main body 10. The positionable arm indicated at 20 is carried by the sleeve 18 and accordingly may be fixed at spaced apart intervals of varying length from the first mentioned arm 15. The positionable arm 20 is fixedly mounted on the upper part of sleeve 18 and has a rearwardly extending or turned portion 20A.

For retaining sleeve 18 in place along the main body, pin means at 22 are provided for insertion within aligned openings 19 in the sleeve and openings 11–14 in the main body with the pin means being tethered to prevent loss by a chain member 23 secured at one of its ends to the sleeve. As shown in FIGURE 2, the openings at 19 in the sleeve in cooperation with the apertures 11 through 14 in the main body provide for longitudinal spacing of the arms 15 and 20 in increments of approximately one-half inch from the dashed line position shown to the opposite broken line rearward position. By such means the positionable arm 20 may be temporarily secured as desired within the distance X along the main body 10 to allow precise take-up of the amount of slack present. The linear distance of a flexible member so tightened will be reduced approximately twice the distance between the fixed arm and the positionable arm as readily understood with regard to FIGURE 1.

When operatively applied to a flexible element such as a rope and swung into a tightened position as shown in FIGURE 1 from the applied or preliminary position of FIGURE 3 the rope will be tightened, exerting increased tension with a resultant force acting on the arm members to move the main body 10 to an upright position. Such movement is restrained by engagement of the retainer hook portion 16A with a point along the rope. The hook shaped portion 16A along with the turned portions 15A and 20A of the fixed and positionable arms insure retention of the device on the rope regardless of the degree of slack later occurring in the flexible member. In rope it is well known that stretching will occur or tightening of knotted portions thereof will necessitate a second or even a third tightening over a short period of time. The hook portion 16A being longitudinally offset from the arms 15 and 20 will cause a slight deflection in the run of the rope engaging the tightening device, such deflection as shown in FIGURE 2 resulting in the rope being located inwardly adjacent the main body 10 and the sleeve 18 to insure retention of the device.

While I have shown a particular form of embodiment of my invention I am aware that many minor changes therein will readily suggest themselves to others skilled in the art without departing from the spirit and scope of the invention. Having thus described my invention, what I claim as new and desire to protect by Letters Patent is:

1. A tightening device for rope and the like comprising in combination,
    an elongate main body portion having longitudinally spaced transverse openings formed therethrough,
    a retainer hook for engagement with the rope depending from said main body,
    a fixed rope engaging arm secured to said main body and extending perpendicularly therefrom,
    a sleeve slidably mounted on said main body and having transversely extending openings which are registrable with the first mentioned openings for the reception of a locking pin passing therethrough, and
    a positionable rope engaging arm carried by said sleeve and extending perpendicularly therefrom positionable and lockable by said pin at selected distances from said fixed arm for taking up varying amounts of slack in the rope, said fixed and positionable arms being turned at their outer ends to lie in planes parallel to each other and to the axis of the main body portion and on opposite sides thereof and are dimensioned so as to retain an associated rope on one side of the body portion so as to prevent accidental separation of the device from the rope.

2. The invention as claimed in claim 1 wherein said retainer hook depends vertically from said main body perpendicularly to said parallel planes whereby a segment of rope engaging said arms and said hook is biased in substantially horizontal and opposite directions at spaced apart points by said arms and said hook further insuring retention of the device on said rope.

3. The invention as claimed in claim 1 wherein the openings in said sleeve permits multiple positioning of said sleeve for each of said first mentioned openings in the main body portion to provide for precise spacing of the arms according to the amount of slack to be taken up.

References Cited
UNITED STATES PATENTS

| | | | |
|---|---|---|---|
| 851,867 | 4/1907 | Cox | 280—180 |
| 1,869,462 | 8/1932 | Burheim. | |
| 2,679,082 | 5/1954 | Himberger | 24—71.3 |
| 2,947,514 | 8/1960 | Goss | 254—78 |

DONALD A. GRIFFIN, Primary Examiner

U.S. Cl. X.R.

254—78